US009012062B2

(12) United States Patent
Smith et al.

(10) Patent No.: US 9,012,062 B2
(45) Date of Patent: Apr. 21, 2015

(54) METHOD OF PROTECTING BATTERY CELLS AND BATTERIES WHICH CONTAIN BATTERY CELLS AND PROTECTED BATTERY CELLS AND BATTERIES WHICH CONTAIN BATTERY CELLS

(75) Inventors: Jeffrey M. Smith, Cambridge, MA (US); Richard A. Wilson, Beverly, MA (US)

(73) Assignee: Bluefin Robotics Corporation, Quincy, MA (US)

( * ) Notice: Subject to any disclaimer, the term of this patent is extended or adjusted under 35 U.S.C. 154(b) by 713 days.

(21) Appl. No.: 13/154,763

(22) Filed: Jun. 7, 2011

(65) Prior Publication Data
US 2011/0300431 A1 Dec. 8, 2011

Related U.S. Application Data

(60) Provisional application No. 61/344,188, filed on Jun. 7, 2010.

(51) Int. Cl.
*H01M 6/42* (2006.01)
*H01M 2/10* (2006.01)
*H01M 2/02* (2006.01)
H01M 10/052 (2010.01)
H01M 6/16 (2006.01)

(52) U.S. Cl.
CPC .......... *H01M 2/1094* (2013.01); *H01M 2/0257* (2013.01); *H01M 10/052* (2013.01); *Y02E 60/122* (2013.01); *H01M 6/16* (2013.01)

(58) Field of Classification Search
USPC ....................................................... 429/149
See application file for complete search history.

(56) References Cited

U.S. PATENT DOCUMENTS

| 3,456,387 A | 7/1969 | Tolson |
| 4,137,376 A | 1/1979 | Clegg et al. |
| 4,483,908 A | 11/1984 | Zimmerman |
| 6,147,472 A | 11/2000 | Hewes et al. |
| 6,180,282 B1 | 1/2001 | Nishida et al. |
| 6,522,531 B1 | 2/2003 | Quintana et al. |
| 6,632,538 B1 * | 10/2003 | Yamazaki et al. ............ 428/461 |
| 2002/0061436 A1 | 5/2002 | Inagaki et al. |
| 2006/0071636 A1 | 4/2006 | Phillips et al. |
| 2008/0020270 A1 | 1/2008 | Park et al. |
| 2008/0220320 A1 | 9/2008 | Horikoshi et al. |
| 2008/0248400 A1 | 10/2008 | Hwang et al. |
| 2008/0311474 A1 * | 12/2008 | Ryou et al. .................... 429/229 |
| 2009/0087727 A1 * | 4/2009 | Harada et al. ................. 429/120 |
| 2010/0086844 A1 | 4/2010 | Mehta et al. |
| 2010/0251695 A1 * | 10/2010 | Summers ........................ 60/253 |

FOREIGN PATENT DOCUMENTS

| JP | 60-81770 A | 5/1985 |
| WO | WO 2008/152803 A1 | 12/2008 |
| WO | WO 2010/026732 A1 | 3/2010 |
| WO | 2010/058587 A1 | 5/2010 |
| WO | WO 2010/062054 A2 | 6/2010 |

OTHER PUBLICATIONS

International Search Report issued Sep. 13, 2011 in PCT/US2011/039409.
Search Report issued Dec. 12, 2013 in European Patent Application No. 11793001.6.
Office Action issued in corresponding European patent application No. 11 793 001.6 dated Aug. 12, 2014.
Xanthos—"Functional Fillers for Plastics", Jan. 1, 2010, pp. 325-327.
Office Action dated Oct. 9, 2014, issued in corresponding Australian patent application No. 2011265071.
Office Action dated Oct. 14, 2014, issued in corresponding Japanese patent application No. 2013-514290 (with English translation).
Patent Examination Report dated Oct. 9, 2014 issued in corresponding Australian patent application No. 2011265071.

* cited by examiner

*Primary Examiner* — Ula C. Ruddock
*Assistant Examiner* — Jacob Marks
(74) *Attorney, Agent, or Firm* — Oblon, McClelland, Maier & Neustadt, L.L.P.

(57) ABSTRACT

Coating a battery cell, or at least one battery cell in an assembly of battery cells or in a battery, or coating an assembly of battery cells or a battery which contains a battery cell or such an assembly with a fire-resistant coating is effective for protecting the cell, assembly, and battery and for retarding fire propagation.

13 Claims, No Drawings

METHOD OF PROTECTING BATTERY CELLS AND BATTERIES WHICH CONTAIN BATTERY CELLS AND PROTECTED BATTERY CELLS AND BATTERIES WHICH CONTAIN BATTERY CELLS

CROSS REFERENCES TO RELATED APPLICATIONS

This application claims priority to U.S. Provisional Patent Application No. 61/344,188, filed on Jun. 7, 2010, which is incorporated herein by reference in its entirety.

BACKGROUND OF THE INVENTION

1. Field of the Invention

The present invention relates to methods for protecting cells and batteries which contain cells. The present invention also relates to protected cells and protected batteries which contain cells and methods for producing such a protected cell and battery.

2. Discussion of the Background

Batteries comprising lithium-based cells can provide the highest energy density of all rechargeable (secondary) cells. Cells are available in a range of energy densities, power densities and packaging options. This energetic battery technology comes at a price, however, as the cells are known for causing a fire hazard when misused.

Today's batteries may be constructed using lithium polymer pouch cells. These pouch cells are welded together to form what are sometimes referred to as bricks, assemblies, or quanta. The quanta are encapsulated and then they are arranged mechanically and electrically to create a battery pack.

Recently, fires caused by lithium-based battery packs have called into question the intrinsic safety and safety testing of such batteries. Currently, there is no alternative for battery power that has high energy density, long cycle life and is safe.

Through good electronics and packaging design, the chance of fires in lithium battery packs can be reduced to a reasonable level. However, even in the best design, fires within cells can and do occur. In many cases a fire in a single cell may be tolerable, but a fire in a multiple cell pack caused by a single cell can quickly turn in to a high energy conflagration that is difficult to extinguish.

Primary batteries (single-use) and secondary batteries (rechargeable) are subject to internal or external failures that cause conflagration of the cell. This conflagration has been shown to propagate rapidly from cell to cell and from battery to battery, releasing tremendous amounts of thermal energy risking human life, facilities, and vehicle platforms.

Thus, there remains a need for lithium-based cells and batteries that are substantially free from the above-discussed problems. In particular, there remains a need for a safe battery system with high power density and high energy and which eliminates or significantly reduces the chance of and extends the time to failure of a cell or battery.

SUMMARY OF THE INVENTION

Accordingly, it is one object of the present invention to provide novel battery cells.

It is another object of the present invention to provide novel battery cells which have a reduced tendency to fail and cause a conflagration.

It is another object of the present invention to provide novel lithium-based battery cells which have a reduced tendency to fail and cause a conflagration.

It is another object of the present invention to provide novel assemblies of battery cells which contain one or more such battery cells.

It is another object of the present invention to provide novel assemblies of battery cells which contain one or more lithium-based battery cells.

It is another object of the present invention to provide novel batteries which contain one or more such battery cells or assemblies of battery cells.

It is another object of the present invention to provide novel batteries which contain one or more lithium-based battery cells or assemblies of lithium-based battery cells.

It is another object of the present invention to provide novel methods of preparing such a battery cell.

It is another object of the present invention to provide novel methods of preparing such a lithium-based battery cell.

It is another object of the present invention to provide novel methods of preparing such an assembly of battery cells.

It is another object of the present invention to provide novel methods of preparing such an assembly of lithium-based battery cells.

It is another object of the present invention to provide novel methods of preparing such a battery.

It is another object of the present invention to provide novel methods of protecting a battery cell.

It is another object of the present invention to provide novel methods of protecting a lithium-based battery cell.

It is another object of the present invention to provide novel methods of protecting an assembly of battery cells.

It is another object of the present invention to provide novel methods of protecting an assembly of lithium-based battery cells.

It is another object of the present invention to provide novel methods of protecting a battery which contains one or more battery cells or one or more assemblies of battery cells.

It is another object of the present invention to provide novel methods of protecting a battery which contains one or more lithium-based battery cells or one or more assemblies of lithium-based battery cells.

These and other objects, which will become apparent during the following detailed description, have been achieved by the inventors' discovery that coating a battery cell, an assembly of battery cells, and/or a battery which contains one or more battery cells or one or more assemblies of battery cells with a fire-resistant coating is effective for protecting the cells, assemblies, and batteries.

Thus, the present invention provides:

(1) A battery cell, in which at least a portion of the exterior of said lithium-based cell is coated with a fire-resistant coating.

(2) A battery cell according to (1), wherein said fire-resistant coating is an ablative coating.

(3) A battery cell according to (1), wherein said fire-resistant coating is an intumescent coating.

(4) A battery cell according to (1), wherein said fire-resistant coating is an endothermic coating.

(5) An assembly of battery cells, which comprises at least one battery cell according to (1).

(6) A battery, which comprises at least one battery cell according to (1).

(7) A battery, which comprises at least one assembly of battery cells according to (5).

(8) A method of preparing a battery cell, said method comprising:
coating at least a portion of the exterior of said battery cell with a fire-resistant coating.
(9) A method according to (8), wherein said fire-resistant coating is an ablative coating.
(10) A method according to (8), wherein said fire-resistant coating is an intumescent coating.
(11) A method according to (8), wherein said fire-resistant coating is an endothermic coating.
(12) A method of preparing an assembly of battery cells, said method comprising:
coating at least a portion of the exterior of said assembly with a fire-resistant coating.
(13) A method according to (12), wherein said fire-resistant coating is an ablative coating.
(14) A method according to (12), wherein said fire-resistant coating is an intumescent coating.
(15) A method according to (12), wherein said fire-resistant coating is an endothermic coating.
(16) A method of preparing a battery which contains at least one battery cell or at least one assembly of battery cells, said method comprising:
coating at least a portion of the exterior of said battery with a fire-resistant coating.
(17) A method according to (16), wherein said fire-resistant coating is an ablative coating.
(18) A method according to (16), wherein said fire-resistant coating is an intumescent coating.
(19) A method according to (16), wherein said fire-resistant coating is an endothermic coating.
(20) A method according to (8), wherein said battery cell is a secondary, rechargeable battery cell.
(21) A method according to (8), wherein said battery cell is a primary, single use battery cell.
(22) A method according to (8), wherein said coating serves to retard fire propagation.
(23) A method according to (8), wherein said coating serves to direct the incendiary event.
(24) A battery cell according to (1), which is a lithium-based battery cell.
(25) A method according to (8), wherein said battery cell is a lithium-based battery cell.

Thus, the present invention provides a cell or quanta (or brick) or battery that has a significant improvement in the reduction or elimination of proliferating events within battery packs through application of ablative, intumescent, and/or endothermic coatings.

DETAILED DESCRIPTION OF THE PREFERRED EMBODIMENTS

The design and production of battery cell, assemblies and batteries which contain such lithium-based cells are known in the art and described in *Kirk-Othmer, Encyclopedia of Chemical Technology*, Fifth Edition, Wiley Interscience, NY, N.Y., vol. 3, pp. 407-561 (2004), and David Linden, *Handbook of Batteries*, McGraw Hill, Inc, ISBN 0-07-037921-1, which are incorporated herein by reference.

In the battery cells of the present invention, at least a portion of the exterior is coated with a fire-resistant coating. Preferably, substantially all of the exterior is coated with a fire-resistant coating. Similarly, it is preferred that substantially all of the exterior of the present assemblies and batteries be coated with a fire resistant coating. The term substantially all of the exterior should be understood to mean all of the exterior with the exception of the areas which must not be coated to permit electrical and/or mechanical connection of the cell, assembly, or battery for installation and/or proper functioning, maintenance, and inspection.

The fire resistant coating may be either an ablative coating, an intumescent coating, or an endothermic coating. Examples of ablative coatings include modified epoxy binders filled with thermally active materials which form cooling gases when exposed to extreme temperatures and polyurethane based coatings containing active fillers that form a liquid film at high temperatures. Such coatings are commercially available and are sold under the names FIREX™ 2373, FIREX™ 2376, and FIREX™ 23903, by MINTEQ International Inc.

An intumescent is a substance which swells as a result of heat exposure, thus increasing in volume, and decreasing in density.

Examples of endothermic coatings include concrete and gypsum.

The coating may be applied by any suitable technique, such as spraying, dip coating, or molding.

The thickness of the coating will depend on the identity of the fire-resistant coating and the degree of protection desired. Generally speaking, the thickness of the coating will range from 1 to 25 mm, preferably 1.5 to 20 mm, more preferably 2 to 15 mm.

In the case of an assembly, one or more of the cells within the assembly may be coated. Alternatively, only the exterior of the assembly may be coated. In another embodiment, one or more of the cells within the assembly may be coated and the exterior of the assembly may also be coated.

In the case of a battery, one or more of the cells or assemblies within the battery may be coated. Alternatively, only the exterior of the battery may be coated. In another embodiment, one or more of the cells or assemblies within the battery may be coated and the exterior of the battery may also be coated.

In one embodiment of the present invention, the battery cell is a lithium-based battery cell.

Other features of the invention will become apparent in the course of the following descriptions of exemplary embodiments which are given for illustration of the invention and are not intended to be limiting thereof.

EXAMPLES

Comparative Example 1

In a first test, a cell was placed directly on a plate that was heated by a MAPP gas torch. The cell erupted in flame in around 24 seconds and reached a maximum temperature of 320° C.

Example 1

In a second test a cell coated with FIREX was placed on the metal plate and heated under the same conditions as in Comparative Example 1. That cell did not catch fire after 3 minutes. Instead the coating prevented heat from damaging the cell and inspection of the cell after the fire showed no visible sign of physical damage.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A battery cell, in which at least a portion of the exterior of said battery cell is coated with an ablative fire-resistant coating comprising a modified epoxy binder filled with a thermally active material that forms a cooling gas when exposed to extreme temperatures.

2. An assembly of battery cells, which comprises at least one battery cell according to claim 1.

3. A battery, which comprises at least one battery cell according to claim 1.

4. A battery, which comprises at least one assembly of battery cells according to claim 2.

5. A method of preparing a battery cell, said method comprising:
    coating at least a portion of the exterior of said battery cell with an ablative fire-resistant coating comprising a modified epoxy binder filled with a thermally active material that forms a cooling gas when exposed to extreme temperatures.

6. A method according to claim 5, wherein said battery cell is a secondary, rechargeable battery cell.

7. A method according to claim 5, wherein said battery cell is a primary, single use battery cell.

8. A method according to claim 5, wherein said coating serves to retard fire propagation.

9. A method according to claim 5, wherein said coating serves to direct an incendiary event.

10. A battery cell according to claim 1, which is a lithium-based battery cell.

11. A method according to claim 5, wherein said battery cell is a lithium-based battery cell.

12. A method of preparing an assembly of battery cells, said method comprising:
    coating at least a portion of the exterior of said assembly with an ablative fire-resistant coating comprising a modified epoxy binder filled with a thermally active material that forms a cooling gas when exposed to extreme temperatures.

13. A method of preparing a battery which contains at least one battery cell or at least one assembly of battery cells, said method comprising:
    coating at least a portion of the exterior of said battery with an ablative fire-resistant coating comprising a modified epoxy binder filled with a thermally active material that forms a cooling gas when exposed to extreme temperatures.

* * * * *